United States Patent
Johansson et al.

(10) Patent No.: US 11,956,665 B2
(45) Date of Patent: Apr. 9, 2024

(54) DETECTING CONGESTION AT AN INTERMEDIATE IAB NODE

(71) Applicant: Telefonaktiebolaget LM Ericsson (publ), Stockholm (SE)

(72) Inventors: Ingemar Johansson, Luleå (SE); Gunnar Mildh, Sollentuna (SE); Filip Barac, Huddinge (SE); Panagiotis Saltsidis, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 389 days.

(21) Appl. No.: 17/422,589

(22) PCT Filed: Dec. 3, 2019

(86) PCT No.: PCT/SE2019/051221
§ 371 (c)(1),
(2) Date: Jul. 13, 2021

(87) PCT Pub. No.: WO2020/159416
PCT Pub. Date: Aug. 6, 2020

(65) Prior Publication Data
US 2022/0095156 A1 Mar. 24, 2022

Related U.S. Application Data

(60) Provisional application No. 62/799,791, filed on Feb. 1, 2019.

(51) Int. Cl.
*H04W 28/02* (2009.01)
*H04L 47/31* (2022.01)
*H04W 84/04* (2009.01)

(52) U.S. Cl.
CPC ......... *H04W 28/0284* (2013.01); *H04L 47/31* (2013.01); *H04W 28/0289* (2013.01); *H04W 84/047* (2013.01)

(58) Field of Classification Search
CPC ......... H04W 28/0289; H04W 28/0284; H04W 84/047; H04L 47/31; H04L 47/122
See application file for complete search history.

(56) References Cited

U.S. PATENT DOCUMENTS 10,505,851 B1 * 12/2019 Matthews ........... H04L 47/6255
10,547,883 B2 * 1/2020 Do ..................... H04N 21/8456
(Continued)

FOREIGN PATENT DOCUMENTS

CN 101286930 B 12/2010
WO 2016184480 A1 11/2016

OTHER PUBLICATIONS

3GPP, "3GPP TR 38.874 0.7.0", 3rd Generation Partnership Project; Technical Specification Group Radio Access Network; Study on Integrated Access and Backhaul; (Release 15), Nov. 2018, 1-111.
(Continued)

Primary Examiner — Brian D Nguyen
(74) Attorney, Agent, or Firm — Murphy, Bilak & Homiller, PLLC

(57) ABSTRACT

A method performed by a first radio network node for handling communication in a wireless communications network providing, is provided. The wireless communications network comprises the first radio network node (131) and a second radio network node (132) relaying data packets between a central network node (12) and a UE (10). The first radio network node is an intermediate network node between the second radio network node and the central network node. The first radio network node detects (701) congestion over a link towards the second radio network node. Upon detection of the congestion the first radio network node adds a marking in a header in a data packet and transmits (702) the data packet towards the second radio network node.

14 Claims, 16 Drawing Sheets

(56) References Cited

U.S. PATENT DOCUMENTS

| | | | |
|---|---|---|---|
| 10,574,577 B1* | 2/2020 | Matthews | H04L 47/125 |
| 10,742,555 B1* | 8/2020 | Shalev | H04L 67/563 |
| 2012/0051216 A1 | 3/2012 | Zhang et al. | |
| 2017/0149665 A1* | 5/2017 | Yousaf | H04L 47/32 |
| 2018/0034524 A1* | 2/2018 | Pao | H04L 1/1607 |
| 2019/0058655 A1* | 2/2019 | McDonald | H04L 45/302 |
| 2020/0396639 A1* | 12/2020 | Hofmann | H04L 69/18 |

OTHER PUBLICATIONS

Alizadeh, Mohammad, et al., "Data Center TCP (DCTCP)", SIGCOMM'10, New Delhi, India, Aug. 30-Sep. 3, 2010, 1-12.

LG Electronics Inc , "Downlink flow control mechanism in IAB", 3GPP TSG-RAN WG2 Meeting #106, R2-1907954, revision of R2-1905068, Reno, NV, USA, May 13-17, 2019, 1-4.

Sequans Communications, "Queue Management vs Flow Control for Congestion Handling", 3GPP TSG-RAN WG2 Meeting #104, R2-1817337, Revision of R2-1815083), Spokane, USA, Nov. 12-16, 2018, 1-6.

* cited by examiner

DETECTING CONGESTION AT AN INTERMEDIATE IAB NODE

TECHNICAL FIELD

Embodiments herein relate to a first radio network node, a second radio network node, a network node and methods performed therein regarding wireless communication. In particular, embodiments herein relate to handling communication, such as handle data packets and/or controlling/managing data packet communication, in a wireless communications network.

BACKGROUND

In a typical wireless communications network, user equipment (UE), also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

3GPP is studying potential solutions for efficient operation of integrated access and wireless access backhaul (IAB) in NR, i.e. using relay nodes to enhance performance of the wireless communication network.

In integrated access and wireless access backhaul, or integrated access backhaul (IAB) for short, there are two kinds of network nodes that are identified as components of a RAN. First, a radio network node denoted as IAB-node, which is a RAN node that supports wireless access to UEs and wirelessly backhauls the access traffic. Furthermore a central network node denoted as an IAB-donor, which is a RAN node which provides UE's interface to core network and wireless backhauling functionality to IAB nodes.

IAB strives to reuse existing functions and interfaces defined for access. In particular, Mobile-Termination (MT), gNB-Distributed Unit (DU), gNB-Central Unit (CU), User Plane Function (UPF), Access and Mobility Management Function (AMF) and Session Management Function (SMF) as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality, such as multi-hop forwarding i.e. using multiple IAB nodes an intermediate nodes before reaching the IAB-donor, is included in the architecture discussion as it is necessary for the understanding of IAB operation and since certain aspects may require standardization.

The Mobile-Termination (MT) function has been defined as a component of the Mobile Equipment. In the context of this study, MT is referred to as a function residing on an IAB-node that terminates the radio interface layers of a backhaul Uu interface toward the IAB-donor or other IAB-nodes.

FIG. 1 shows a reference diagram for IAB in standalone mode, which contains one IAB-donor and multiple IAB-nodes. The IAB-donor may be treated as a single logical node that comprises a set of functions such as gNB-DU, gNB-CU-control plane (CP), gNB-CU-user plane (UP) and potentially other functions. In a deployment, the IAB-donor may be split according to these functions, which may all be either collocated or non-collocated as allowed by 3GPP NG-RAN architecture. IAB-related aspects may arise when such split is exercised. Also, some of the functions presently associated with the IAB-donor may eventually be moved outside of the IAB-donor in case it becomes evident that they do not perform IAB-specific tasks. FIG. 1 is a reference diagram for IAB-architectures 3GPP TR 38.874 v0.7.0.

It has been agreed that the IAB-node's DU function terminates an F1 interface towards the CU-CP and CU-UP. The DU function of IAB nodes is identical to the function of a gNB-DU, and the same holds for the functions of IAB-donor CU and gNB-CU. FIG. 2 and FIG. 3 show the assumed protocol stacks for supporting the F1 interface over multi-hop IAB networks, i.e. more than one radio network node relaying data packets. FIG. 2 illustrates a protocol stack for supporting F1-U. FIG. 3 illustrates a protocol stack for supporting F1-control (C). It is assumed that the Flow Control (FC) specified over the F1-U interface between the DU and CU-UP also will be supported by the IAB node towards the CU-UP in the IAB-donor. This flow control could help support varying throughput towards between the IAB node and UE over a radio interface. E.g. if the radio interface throughput decreases the IAB node could indicate to the CU-UP to slow down downlink (DL) traffic to avoid buffer overflow in the IAB node. No direct support for controlling buffer sizes in intermediate nodes has been specified so far for IAB. RLC means Radio Link Control protocol, MAC means Medium Access Control, and PHY means physical layer.

The legacy F1-U is using services of the Transport Network Layer (TNL) in order to allow FC of user data packets transferred from the node hosting the NR Packet Data Convergence Protocol (PDCP), e.g. CU-UP in the case of CU-DU split, to the corresponding node, i.e. the DU. The F1-U protocol data is conveyed by a GPRS Tunneling Protocol (GTP)-U protocol, by means of a RAN Container GTP-U extension header. The GTP-U protocol over User Datagram Protocol (UDP)/Internet Protocol (IP) serves as the TNL for data streams on the F1 interface.

In the IAB context, the NR F1-U FC is executed end-to-end (E2E) between the IAB-donor CU-UP and an access IAB node, regardless of whether the access IAB node and the IAB-donor CU are one or several hops (or IAB nodes) apart. On the other hand, during the 3GPP study phase it was argued that certain enhancements to the F1-U FC may be necessary in order to accommodate the needs of IAB FC. In particular, it was argued that End-to-End (E2E) F1-U FC may be slow in reacting to fast and short-lived congestion events on individual links (in a multi-hop scenario), and that enhancements to the legacy F1-U FC may be necessary.

SUMMARY

As a part of developing embodiments herein the inventors identified a problem which first will be discussed.

The slow reaction was assumed to be the consequence of the following:

In legacy F1-U FC, the information provided to the IAB-donor CU by an IAB node concerns only the bearers for the UEs that are being directly served by that IAB node. For example, in FIG. 4, the Downlink Data Delivery Status (DDDS) sent from IAB2 to the IAB-donor CU would contain info only about the data flows destined to UE2_1 and UE2_2. This is because the data that is intended for the UEs of the descendant IAB nodes (also the descendants of these IAB nodes and so on) is simply passed further on, via the Adaptation layer (Adapt), and will therefore not be reflected in the DDDS. The problem with the above is that congestion may be caused at this IAB node, which aggregates the user traffic of subordinate IAB-nodes towards the IAB-donor, by the transiting traffic (i.e. traffic flows not destined to UE2_1 and UE2_2), which is not reflected in the DDDS. It is this multiplexing function of the IAB-node that cannot be regulated by the existing F1-U methods. For example, DDDS from IAB2 will not take into account the information related to the traffic destined to UE3_1. If the CU receiving DDDS from IAB2 notices a throughput or packet drop on the flows destined at UE2_1 and UE2_2, it may throttle the traffic of the two UEs. This may not solve the congestion problem at IAB2 if the two UEs were not the cause of the congestion.

Another issue with the E2E FC scheme is that there is no way of pinpointing where exactly the problem is occurring in a multi-hop setting. The problem could have been in any of the intermediate nodes, but what the CU will see is that the throughput for those bearers has dropped and will throttle them. For example, in FIG. 4, a downlink data delivery status report from IAB6 indicating loss of throughput will not be useful to identify if the problem is in the hop between IAB1 and IAB2, or IAB2 and IAB4 or IAB4 and IAB6 and/or which UEs/bearers are the cause of the problem.

From the above it follows that an essential drawback of applying the current F1-U FC to IAB is that a data packet flow not causing congestion on a link may be throttled. In addition, legacy F1-U FC applied to IAB has no means of pinpointing the exact congested link on a path.

An object of embodiments herein is to provide a mechanism to enable communication, e.g. handle or manage data packets, in an efficient manner in a wireless communications network.

According to an aspect the object is achieved, according to embodiments herein, by providing a method performed by a first radio network node, such as a relay node also denoted as IAB node, for handling data packets or handling communication in a wireless communications network, wherein the wireless communications network comprises the first radio network node and a second radio network node relaying data packets between a central network node and a UE. The first radio network node is an intermediate network node between the second radio network node and the central network node. The first radio network node detects congestion over a link towards the second radio network node e.g. a data packet experiences a delay above a threshold. Upon detection of the congestion the first radio network node adds a marking e.g. sets a flag, in a header such as an adaptation layer header in a data packet and transmits the data packet towards the 30 second radio network node.

According to another aspect the object is achieved, according to embodiments herein, by providing a method performed by a second radio network node, such as a relay node also denoted as IAB node, for handling data packets or handling communication in a wireless communications network, wherein the wireless communications network comprises a first radio network node and the second radio network node relaying data packets between a central network node and a UE. The second radio network node is connected directly to one or more UE wirelessly. The second radio network node receives one or more data packets with marking indicating congestion at the first radio network node. The second radio network node further transmits a report to the central network node indicating that the first radio network node experiences congestion. The report may include more detailed information that quantifies the amount of congestion, such as e.g. the number of marked bytes during the period between two reports. By comparing the number of marked bytes with the number of bytes sent downstream since the last report, the central network node may conclude whether and how much to slow down the transmission for the flow in question.

According to yet another aspect the object is achieved, according to embodiments herein, by providing a method performed by a central network node, such as an IAB donor, for handling data packets or handling or managing communication in a wireless communications network, wherein the wireless communications network comprises a first radio network node and a second radio network node relaying data packets between the central network node and a UE, wherein the first radio network node is an intermediate network node between the second radio network node and the central network node. The central network node receives a report from the second radio network node, The report comprises information that congestion has been detected in the first radio network node. The central network node uses the report to control packet transmissions.

According to another aspect of embodiments herein, the object is achieved by providing a first radio network node, such as a relay node also denoted as IAB node, for handling data packets or handling communication in a wireless communications network, wherein the wireless communications network comprises the first radio network node and a second radio network node relaying data packets between a central network node and a UE. The first radio network node is an intermediate network node between the second radio network node and the central network node. The first radio network node is configured to detect congestion over a link towards the second radio network node e.g. a data packet experiences a delay above a threshold. Upon detection of the congestion the first radio network node is configured to add a marking e.g. sets a flag, in a header such as an adaptation layer header in a data packet and to transmit the data packet towards the second radio network node.

According to another aspect of embodiments herein, the object is achieved by providing a second radio network node, such as a relay node also denoted as IAB node, for handling data packets or handling communication in a wireless communications network, wherein the wireless communications network comprises a first radio network node and the second radio network node relaying data packets between a central network node and a UE. The second radio network node is connected directly to one or more UE wirelessly. The second radio network node is configured to receive a data packet carrying a marking, from a first radio network node. The second radio network node is further configured to transmit a report, to the central network node, wherein the report comprises information that congestion has been detected in the first radio network node. The report may include more detailed information that quantifies the amount of congestion, such as e.g. the number of marked bytes during the period between two reports. By comparing the number of marked bytes with the number of bytes sent downstream since the last report, the central network node may conclude whether and how much to slow down the transmission for the flow in question.

According to another aspect of embodiments herein, the object is achieved by providing a central radio network node for handling data packets or handling communication in a wireless communications network, wherein the wireless communications network comprises a first radio network node and a second radio network node relaying data packets between the central network node and a UE. The first radio network node is an intermediate network node between the second radio network node and the central network node. The central radio network node is configured to receive a report comprising marked information in a data packet, from the second radio network node. The report indicates that the first radio network node experiences congestion. The central network node uses the report to control packet transmissions.

It is furthermore provided herein a computer program product comprising instructions, which, when executed on at least one processor, cause the at least one processor to carry out the method above, as performed by the transmitting device or the receiving device, respectively. It is additionally provided herein a computer-readable storage medium, having stored there on a computer program product comprising instructions which, when executed on at least one processor, cause the at least one processor to carry out the method according to the method above, as performed by the transmitting device or the receiving device, respectively.

The provided embodiments with a) congestion marking in intermediate IAB nodes such as the first radio network node and b) a feedback of the experienced congestion along the data path between IAB-donor such as the central network node and an egress IAB such as the second radio network node, enables a timely and efficient congestion control. Moreover, the congestion control may affect the flows that cause congestion. The solution makes it possible to achieve low excess delay over the IAB path, even in times when the network is loaded and this may have positive effect on time-sensitive user and signaling traffic over IAB. This may be achieved since the embodiments herein may adjust the end-to-end flow data rate so that the buffers in intermediate nodes are kept small. If congestion occurs the intermediate nodes may start performing packet marking which may be detected in the end-to-end flow control making it possible to reduce the flow rate. The idea complements traditional flow control solutions that are based on Round Trip Time (RTT) or packet loss measurement techniques.

BRIEF DESCRIPTION OF THE DRAWINGS

Embodiments will now be described in more detail in relation to the enclosed drawings, in which.

DETAILED DESCRIPTION

Figure 1:
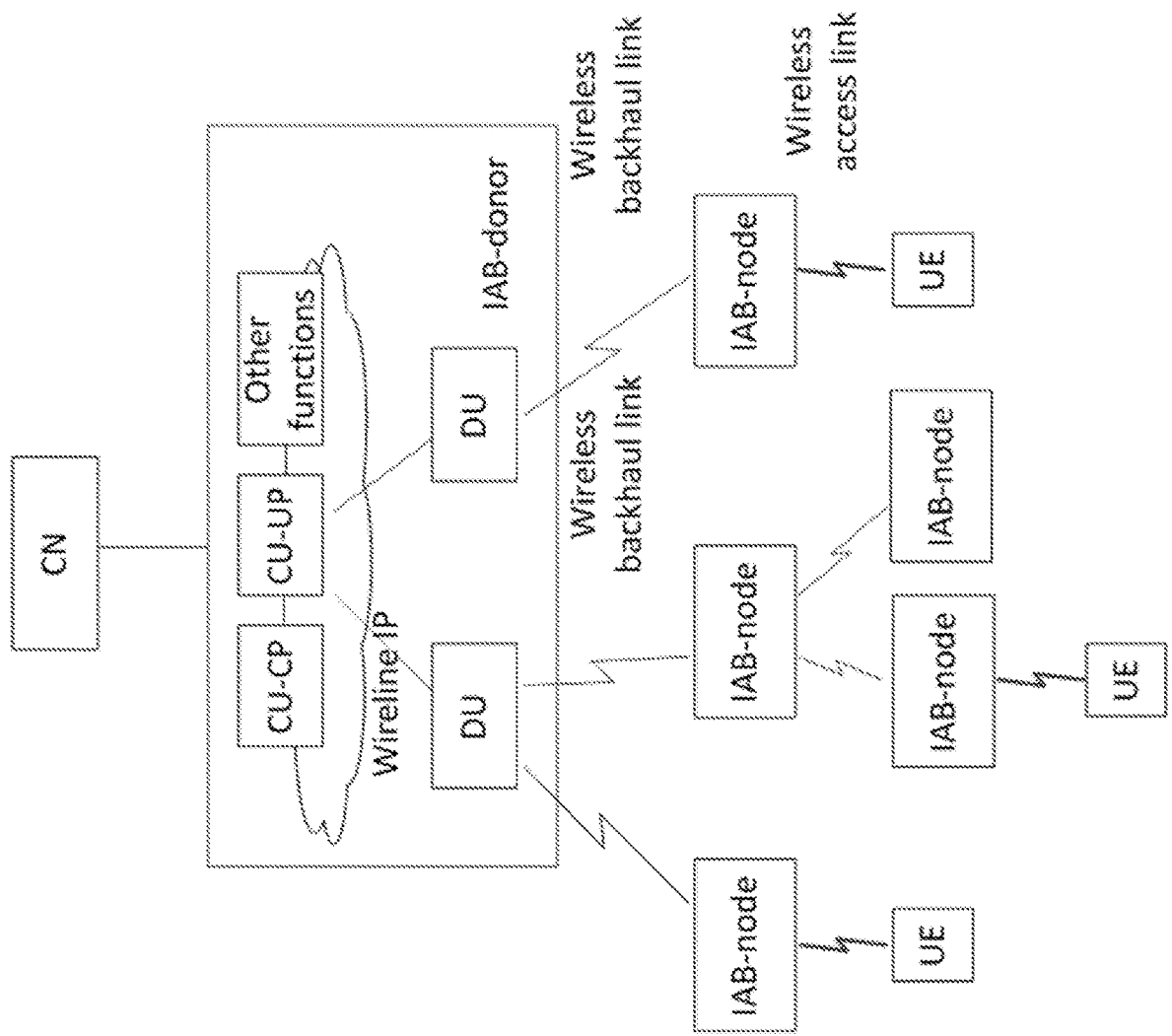
FIG. 1 is a is a reference diagram depicting IAB-architectures.
Figure 2:
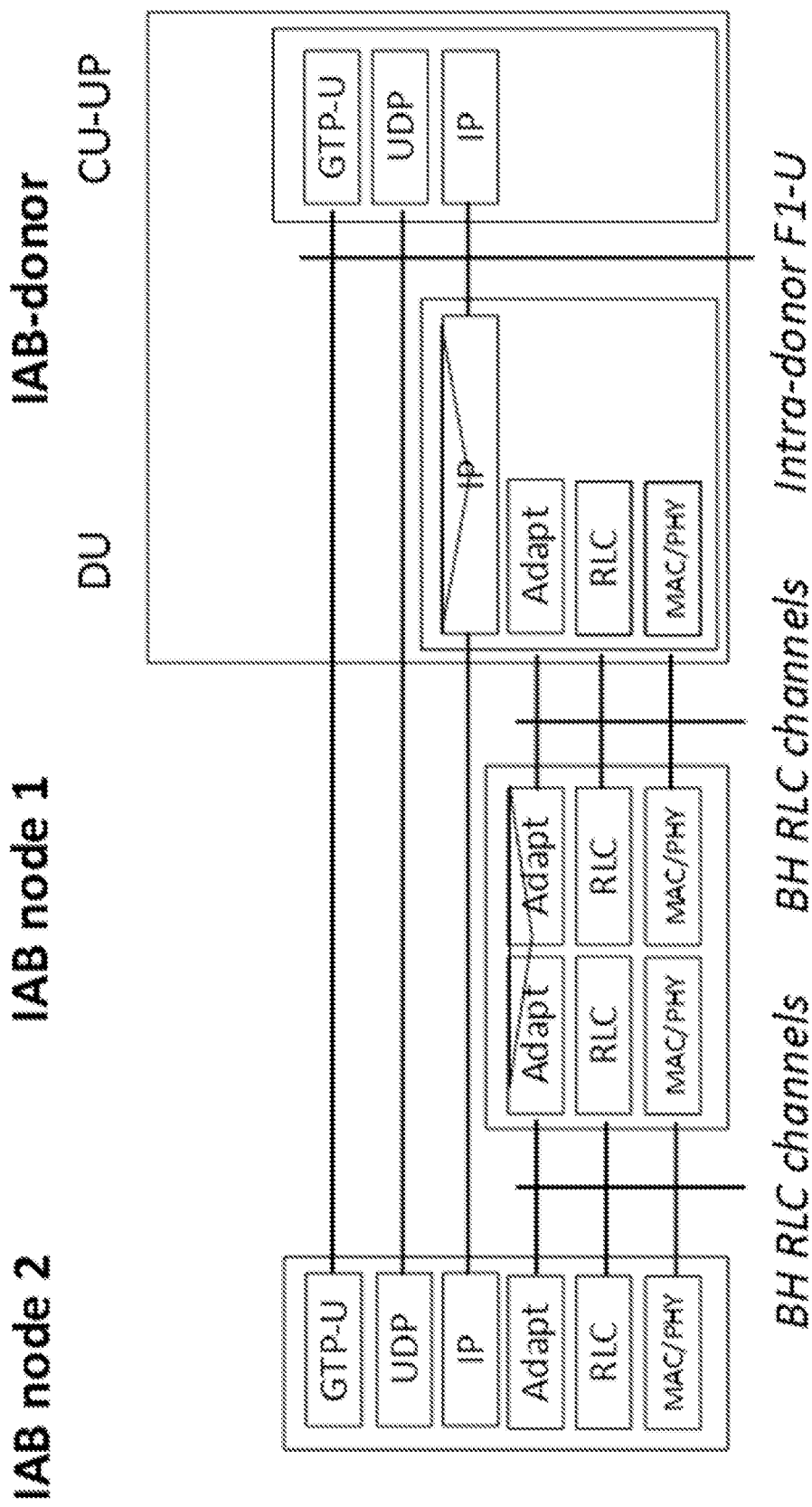
FIG. 2 is a schematic overview depicting assumed protocol stacks for supporting the F1 interface over multi-hop IAB networks.
Figure 3:
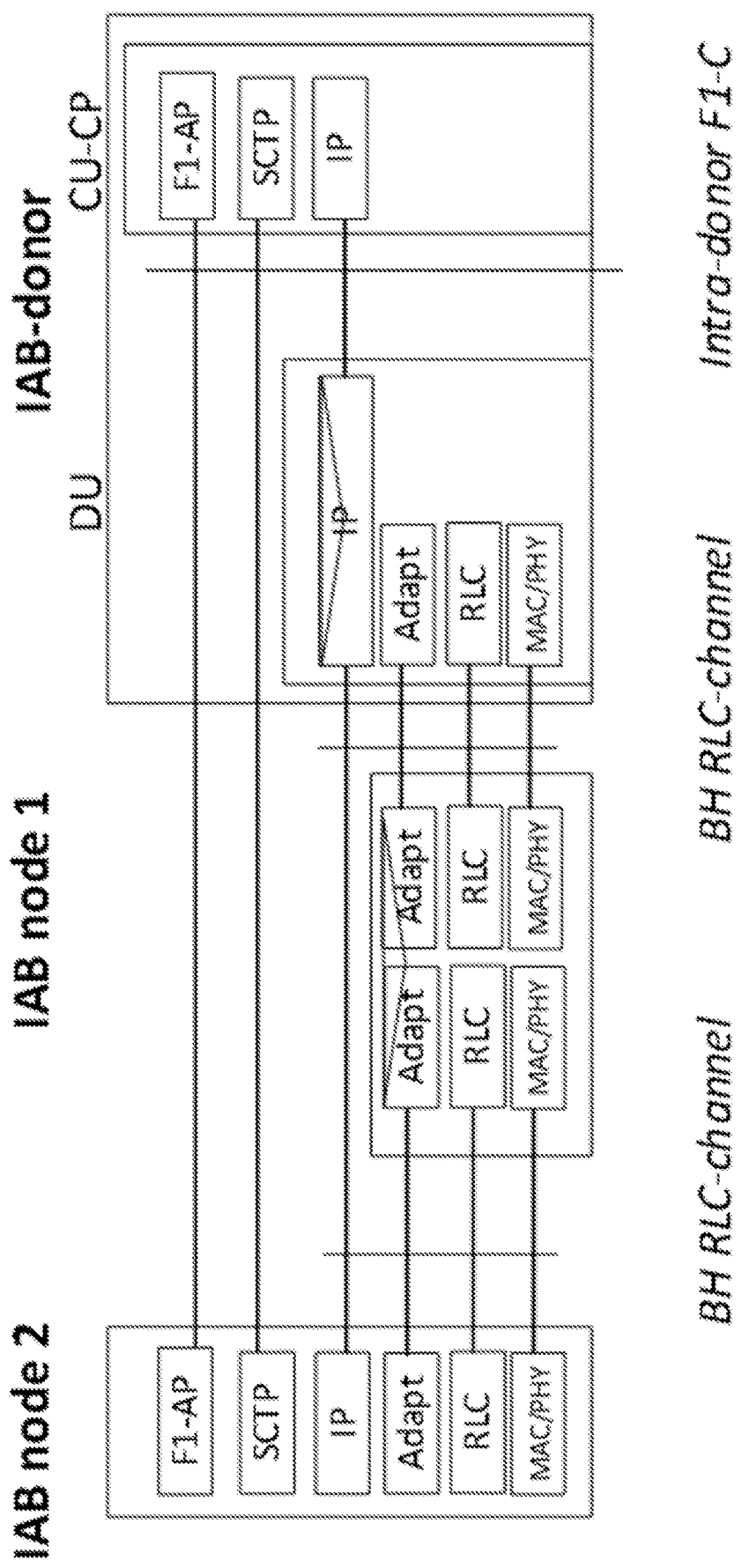
FIG. 3 is a schematic overview depicting assumed protocol stacks for supporting the F1 interface over multi-hop IAB networks.
Figure 4:
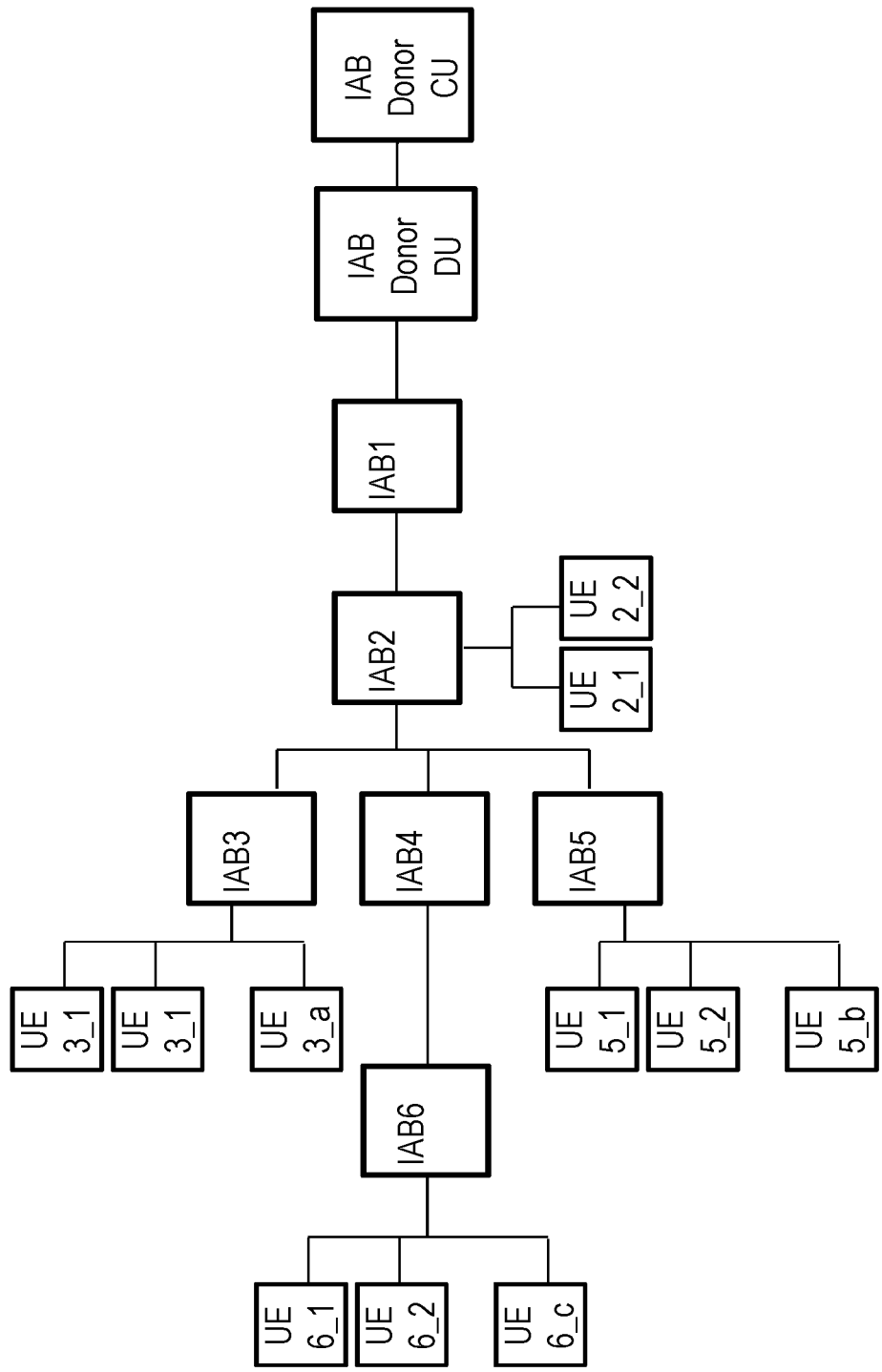
FIG. 4 is a schematic overview depicting network nodes.
Figure 5:
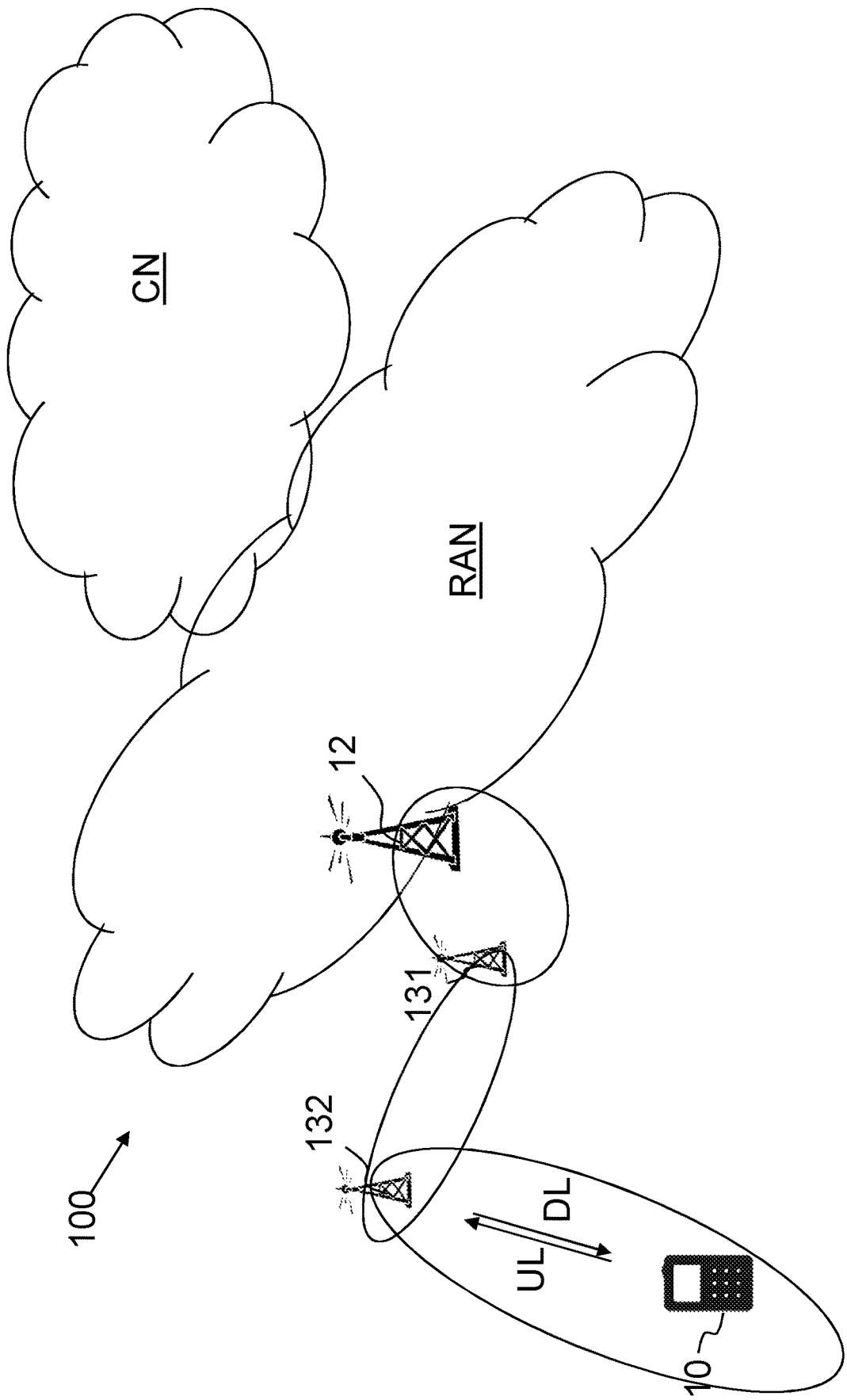
FIG. 5 is a schematic overview depicting a wireless communications network according to embodiments herein.

Embodiments herein relate to wireless communications networks in general. FIG. 5 is a schematic overview depicting a wireless communications network 100. The wireless communications network 100 comprises one or more RANs and one or more CNs. The wireless communications network 100 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 100, a wireless device or UE 10 such as a mobile station, a non-access point (non-AP) STA, a STA, a user equipment (UE) and/or a wireless terminal, is comprised communicating via e.g. one or more Access Networks (AN), e.g. RAN, to one or more core networks (CN). It should be understood by the skilled in the art that "wireless device" is a non-limiting term which means any terminal, wireless communications terminal, user equipment, NB-IoT device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 100 comprises a central network node 12 such as a IAB-donor node e.g. baseband unit (BBU) such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a stand-alone access point or any other network unit or node capable of communicating with a wireless device within the area served by the radio network node depending e.g. on a first radio access technology and terminology used. It should be noted that a service area may be denoted as cell, beam, beam group or similar to define an area of radio coverage.

The wireless communication network further comprises a first radio network node 131 connected in-between the central network node and the UE 10. The first radio network node 131 may be an IAB node e.g. a radio remote unit (RRU) such as an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on a first radio access technology and terminology used. It should be noted that a service area may be denoted as cell, beam, beam group or similar to define an area of radio coverage.

The wireless communication network further comprises a second radio network node 132 connected in-between the central network node and the UE 10. The second radio network node 132 may be connected to the UE 10 directly and may be an egress point. The second radio network node 132 may be an IAB node e.g. a radio remote unit (RRU) such as an access node, antenna unit, radio unit of e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on a first radio access technology and terminology used. It should be noted that a service area may be denoted as cell, beam, beam group or similar to define an area of radio coverage.

Embodiments herein disclose a solution wherein the first radio network node 131 marks a packet upon detection of congestion and transmits the packet to the second radio network node 132. The second radio network node 132 transmits a report back to the central network node 12 indicating that the first radio network node 131 experiences congestion. Thus, the central network node may handle communication over links based on this knowledge. Thus, the proposed solution with congestion marking in intermediate IAB nodes such as the first radio network node and a feedback of the experienced congestion along the data path between IAB-donor such as the central network node and an egress IAB such as the second radio network node, enables a timely and efficient congestion control that may affect the flows that cause congestion.

Figure 6:
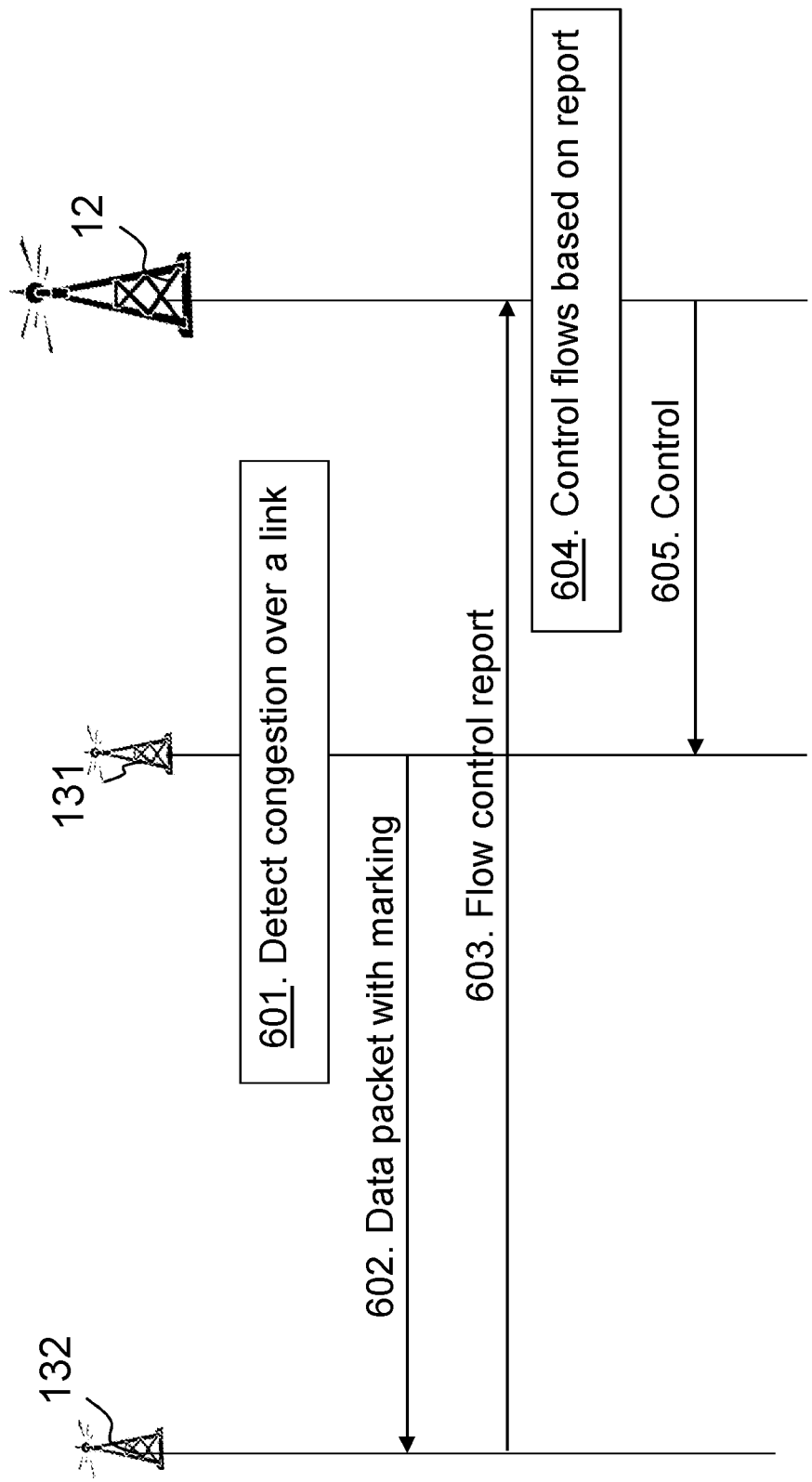
FIG. 6 is a is a combined signalling scheme and flowchart according to some embodiments herein.

FIG. 6 is a combined signalling scheme and flowchart according to some embodiments herein.

Action 601. The first radio network node 131, such as an intermediate IAB node, detects congestion over the link e.g. towards the second radio network node 132 e.g. a data packet experiences a delay above a threshold.

Action 602. Upon detection of the congestion the first radio network node 131 adds a marking e.g. sets a flag, in a header such as an adaptation layer header in a data packet, also referred to as "the data packet has been added with a marking indicating that congestion is detected". The first radio network node 131 and transmits the data packet towards the second radio network node 132.

In order to address disadvantages mentioned above, embodiments herein accurately indicate to the central network node 12 such as a IAB-donor CU which data flows are responsible for the congestion, in order for the network node to take the right actions. According to embodiments herein, packet marking may be to introduce at intermediate radio network nodes. Packet marking may be introduced in e.g. Data Center Transmission Control Protocol (TCP) to tackle problems, where several network nodes send large amounts of traffic at the same time and it is useful to react on very short queue delays.

Action 603. The second radio network node 132 receives the marked packet and reports back to the central network node 12 using e.g. a report, such as a FC report. The report may include information about one or more packet has exceeded the threshold of delay, indicate a volume of received data packets (bytes) with said indication of threshold exceeded, which node has marked the packets, that resource availability (resource blocks) is becoming scarce at the first radio network node 131, in case of several congested radio network nodes on an end-to-end path, an indication of the first radio network node 131 that experiences the delay on the path or a list of nodes experiencing the delay on the end-to-end path. Thus the report may give information about the congestion level in the form of how often a target delay has been exceeded, counted either in number of marked packets or as a volume of received packets (bytes) that was marked.

Action 604. The central network node 12, such as a IAB donor, receives the report and based on the report the central network node 12 controls radio resources and flows. The central network node 12 may e.g. throttle the flows traversing the congested radio network nodes. The central network node 12 may conclude e.g. whether and how much to slow down the transmission for the flow in question. The central network node 12 may implement buffering and queue management functionality on end to end traffic. The central network node 12 based on the congestion indication received in the report, may reroute one or more marked end-to-end connections by changing intermediate radio network nodes of these end-to-end connections.

Action 605. The central network node 12 may e.g. transmit a command controlling rate or reducing a flow related to the first radio network node 131.

Applied to the IAB context, if an egress packet, e.g. a data packet for transmission over egress port, has experienced a queuing delay exceeding some predefined (configurable) threshold, the radio network node in question may set an excess delay flag in a next egress data packet. Egress means outgoing, such as egress port meaning outgoing port and egress data packet meaning outgoing data packet, etc. The marked data packet would travel all the way to its destination IAB node, which may then feed this information to the IAB-donor CU, indicating on which flow(s) the congestion has occurred or is likely to occur. The IAB-donor CU may then throttle the flows traversing the congested nodes. A single bit in the adaptation header may be sufficient for the marking although additional marking providing more information on where the congestion occurred is not excluded.

The egress queuing delay threshold for triggering the packet marking may be configurable. However, setting a threshold significantly lower than a typical queuing delay experienced at congestion seems plausible. Namely, setting a low threshold implies keeping the buffer fill rate at a low level, thus enabling reducing the probability of sudden congestion, thus eliminating the need for a dedicated IAB hop by a hop FC mechanism as has been suggested during the IAB study phase. Other mechanisms than queue delay may be used, for instance a detection of imminent queue build-up due to scheduling resource depletion may be used. This is listed below stating: where the mark indicates that resource availability (resource blocks) is becoming scarce.

The reporting of flow control from the second radio network node 132 to the central network node 12 may be done at regular intervals, e.g. every few milliseconds. The report may include more detailed information that quantifies the amount of congestion, such as e.g. the number of marked bytes during the period between two reports. By comparing the number of marked bytes with the number of bytes sent downstream since the last report, the IAB-donor CU may conclude whether and how much to slow down the transmission for the flow in question.

It should be clear that marking is not a separate FC mechanism, but that it is rather an enhancement to the legacy F1-U FC. The enhancement consists of packet marking in the Adaptation layer header and reporting to the CU that the packet was delayed on the way. The proposal is complementary to the legacy F1-U FC, which focuses on delivery status on the radio link to the UE, while packet marking tackles congestion on intermediate hops. Embodiments herein introduces packet marking, while it is up to the node implementation how to react to congestion.

The actual implementation of the flow control may differ. The main principle is that the indication of the occasions when the delay target is exceeded is used to control how fast the central network node is allowed to transmit packets. In the case that the delay target is not exceeded then the sending rate is allowed to increase. In case there are a few occasions where the delay target is increased then the sending rate can be decreased a little, whereas if there are many occasions where the delay target is exceeded then the sending rate is decreased by a larger amount. This logic may be simplified by comparing the volume of transmitted bytes with the volume of marked bytes and how these two values have increased over a time period, for example between two consecutive feedback reports or every round-trip time over the IAB path. As described above it was assumed that packets are marked when a delay target is exceeded, it is however possible to use other metrics to determine when to mark packets. For example, it is possible to use an indication that resource availability, for instance resource blocks, is getting scarce, as a trigger for packet marking.

Figure 7:
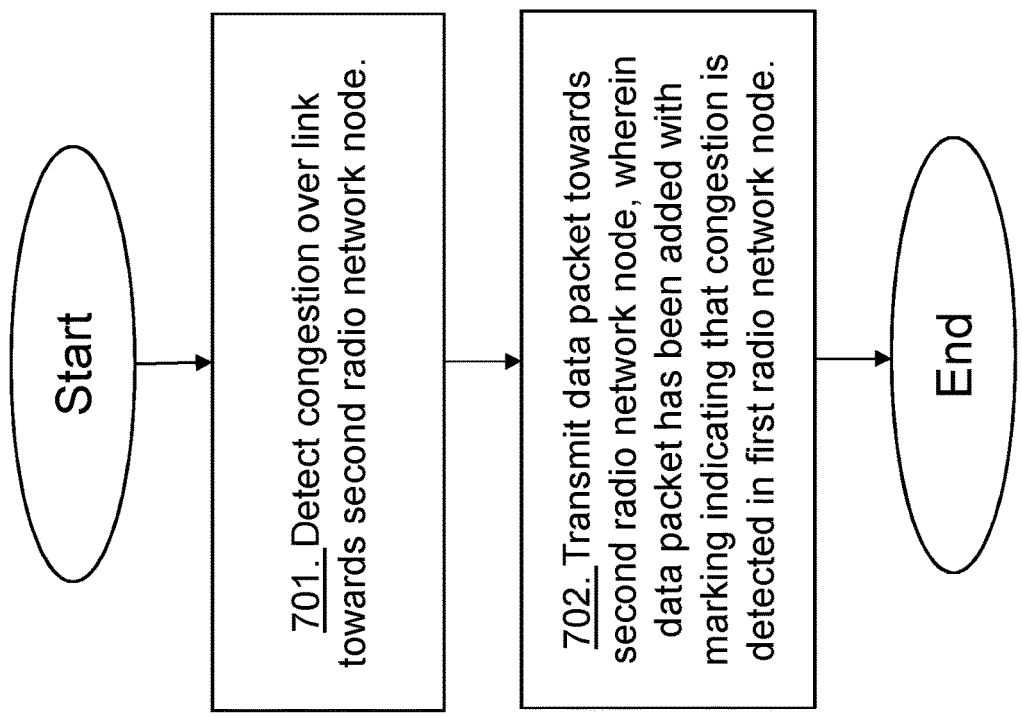
FIG. 7 is a schematic flowchart depicting a method performed by a first radio network node according to embodiments herein.
Figure 8:
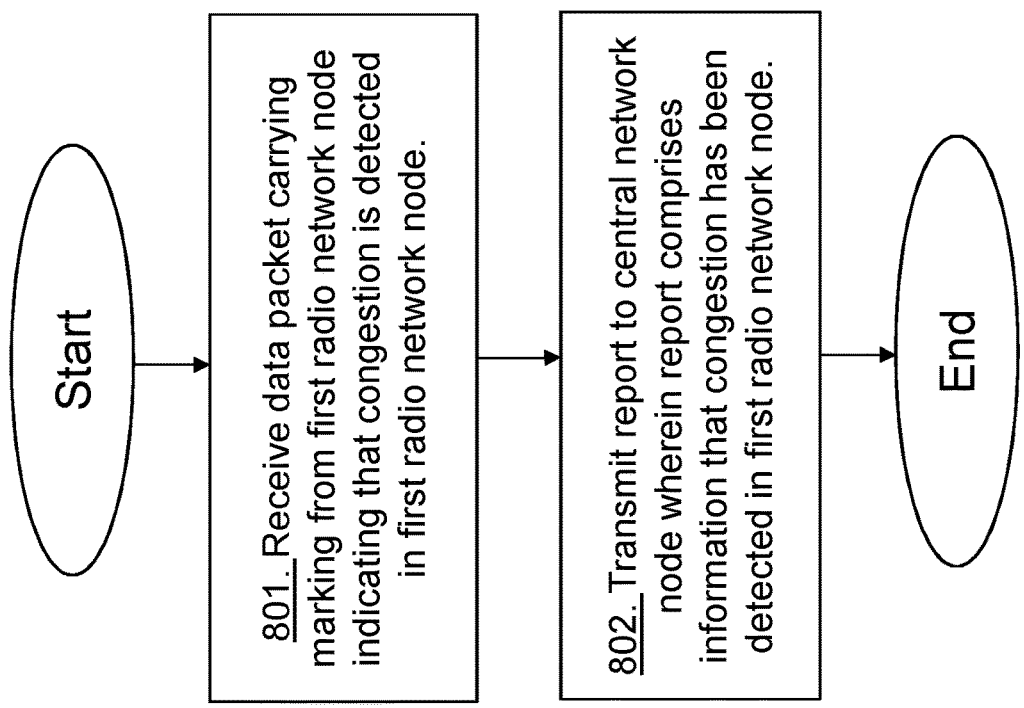
FIG. 8 is a schematic flowchart depicting a method performed by a second radio network node according to embodiments herein.
Figure 9:
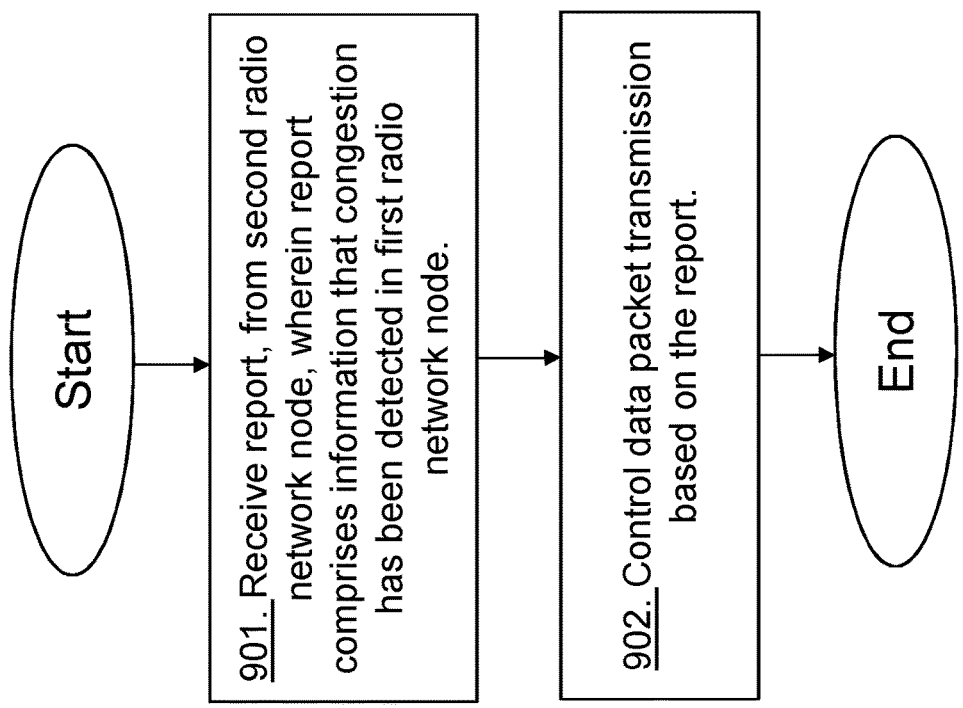
FIG. 9 is a schematic flowchart depicting a method performed by a central radio network node according to embodiments herein.

The method will now be described in view if the first radio network node 131 together with FIG. 7, in view if the second radio network node 132 together with FIG. 8, and in view if the central radio node 12 together with FIG. 9.

The method actions performed by the first radio network node 131 for handling data packets or handling communication in a wireless communications network 1 according to embodiments herein will now be described with reference to a flowchart depicted in FIG. 7. The wireless communications network 1 comprises the first radio network node 131 and a second radio network node 132 relaying data packets between a central network node 12 and a UE. The first radio network node 131 is an intermediate network node between the second radio network node 132 and the central network node 12.

In some embodiments any one or more out of:—The first network node 131 is represented by an intermediate IAB node in a multi-hop IAB network, —the second network node 132 is represented by a final Integrated Access and wireless access Backhaul, IAB node, in a multi-hop IAB network, and—the central network node 12 is represented by an IAB donor node.

The actions do not have to be taken in the order stated below, but may be taken in any suitable order.

Action 701. The first radio network node 131, such as a relay node also denoted as IAB node, detects congestion over the link e.g. towards the second radio network node 132 e.g. a data packet experiences a delay above a threshold. This action relates to embodiments described in Action 601 above. The detected congestion may comprise any one out of: That a delay is experienced of a packet that has exceeded a threshold, and resource blocks availability is becoming scarce.

Action 702. The first radio network node 131 transmits a data packet towards the second radio network node 132, wherein the data packet has been added with a marking indicating that congestion is detected in the first radio network node 131. The expression "the data packet has been added with a marking" means as described above that a marking is added e.g. sets a flag, in a header such as an adaptation layer header in a data packet. The expression "the data packet has been added with a marking" may give the impression that extra packets are injected in the packet flow, while this is also a possibility, the intention with the expression is to set a flag in an applicable packet field meaning that the data packet has been marked indicating that congestion is detected. A single bit in the Adaptation header may be sufficient for the marking although additional marking providing more information on where the congestion occurred is not excluded. This action relates to embodiments described in Action 602 above.

The marking may further comprise an indication that indicates any one out of: Which node that has experienced a delay, or, in case of several congested nodes, an end-to-end path on which nodes that has experienced a delay, in case of several congested nodes, the first radio network node that experiences a delay on the path or in case of several congested nodes, the full list of nodes experiencing a delay on the end-to-end path.

The method actions performed by the second radio network node 132 for handling data packets or handling communication in a wireless communications network 1 according to embodiments herein will now be described with reference to a flowchart depicted in FIG. 8. The wireless communications network 1 comprises the first radio network node 131 and the second radio network node 132 relaying data packets between a central network node 12 and a UE. The second radio network node 132 is wirelessly connected directly to one or more UE.

In some embodiments any one or more out of:—The first network node 131 is represented by an intermediate IAB node in a multi-hop IAB network, —the second network node 132 is represented by a final Integrated Access and wireless access Backhaul, IAB node, in a multi-hop IAB network, and—the central network node 12 is represented by an IAB donor node.

The actions do not have to be taken in the order stated below, but may be taken in any suitable order.

Action 801. The second radio network node 132, such as a relay node also denoted as IAB node, receives a data packet carrying a marking, from the first radio network node 131, wherein the marking indicates that congestion is detected in the first radio network node 131. This action relates to embodiments described in Action 602 above.

The detected congestion in the first radio network node 131 may comprise any one out of:—That a delay is experienced in the first radio network node 131 of a packet that has exceeded a threshold, and—resource blocks availability in the first radio network node 131 is becoming scarce.

The marking may further comprise an indication that indicates any one out of: Which node that has experienced a delay, or, in case of several congested nodes, an end-to-end path on which nodes that has experienced a delay, in case of several congested nodes, the first radio network node that experiences a delay on the path or in case of several congested nodes, the full list of nodes experiencing a delay on the end-to-end path.

Action 802. The second radio network node 132 transmits a report to the central network node 12. The report comprises information that congestion has been detected in the first radio network node 131, e.g. also information about the level of congestion. This action relates to embodiments described in Action 603 above. This report may not need to be transmitted immediately.

The information in the report that congestion has been detected in the first radio network node 131 may comprise any one or more out of:—A flow control report including information about that one or more packet has exceeded a threshold; —a flow control report indicating a volume of received packets with an indication of delay threshold exceeded, and—information about which radio network node has marked the packets.

The method actions performed by the central radio network node 12 for handling data packets or handling communication in a wireless communications network 1 according to embodiments herein will now be described with reference to a flowchart depicted in FIG. 9. The wireless communications network 1 comprises a first radio network node 131 and a second radio network node 132 relaying data packets between the central network node 12 and a UE. The first radio network node 131 is an intermediate network node between the second radio network node 132 and the central network node 12.

In some embodiments any one or more out of:—The first network node 131 is represented by an intermediate IAB node in a multi-hop IAB network, —the second network node 132 is represented by a final Integrated Access and wireless access Backhaul, IAB node, in a multi-hop IAB network, and—the central network node 12 is represented by an IAB donor node.

The actions do not have to be taken in the order stated below, but may be taken in any suitable order.

Action 901. The central radio network node 12, such as an IAB donor receives a report, from the second radio network node 132, wherein the report comprises information that congestion has been detected in the first radio network node 131. This action relates to embodiments described in Action 604 above.

The information in the report that congestion has been detected in the first radio network node 131 may comprise any one or more out of:—A flow control report including information about that one or more packet has exceeded a threshold; —a flow control report indicating a volume of received packets (bytes) with an indication of delay threshold exceeded, and—information about which radio network node has marked the packets.

Action 902. The central radio network node 12 then controls data packet transmission based on the report. The central network node 12 may e.g. throttle the flows traversing the congested radio network nodes. The central network node 12 may conclude e.g. whether and how much to slow down the transmission for the flow in question. The central network node 12 may implement buffering and queue management functionality on end to end traffic. The central network node 12, based on the congestion indication received in the report, may reroute one or more marked end-to-end connections by changing intermediate radio network nodes of these end-to-end connections. This action relates to embodiments described in Action 604 above.

The controlling of the data packet transmission based on the report may e.g. comprise adjusting packet transmission rate based on the indication of congestion.

The controlling of the data packet transmission based on the report comprises any one or more out of:—Implementing buffering and queue management functionality on end to end traffic to overcome the congestion indicated, and— rerouting one or more marked end-to-end connections by changing intermediate network nodes of these end-to-end connections.

Figure 10:
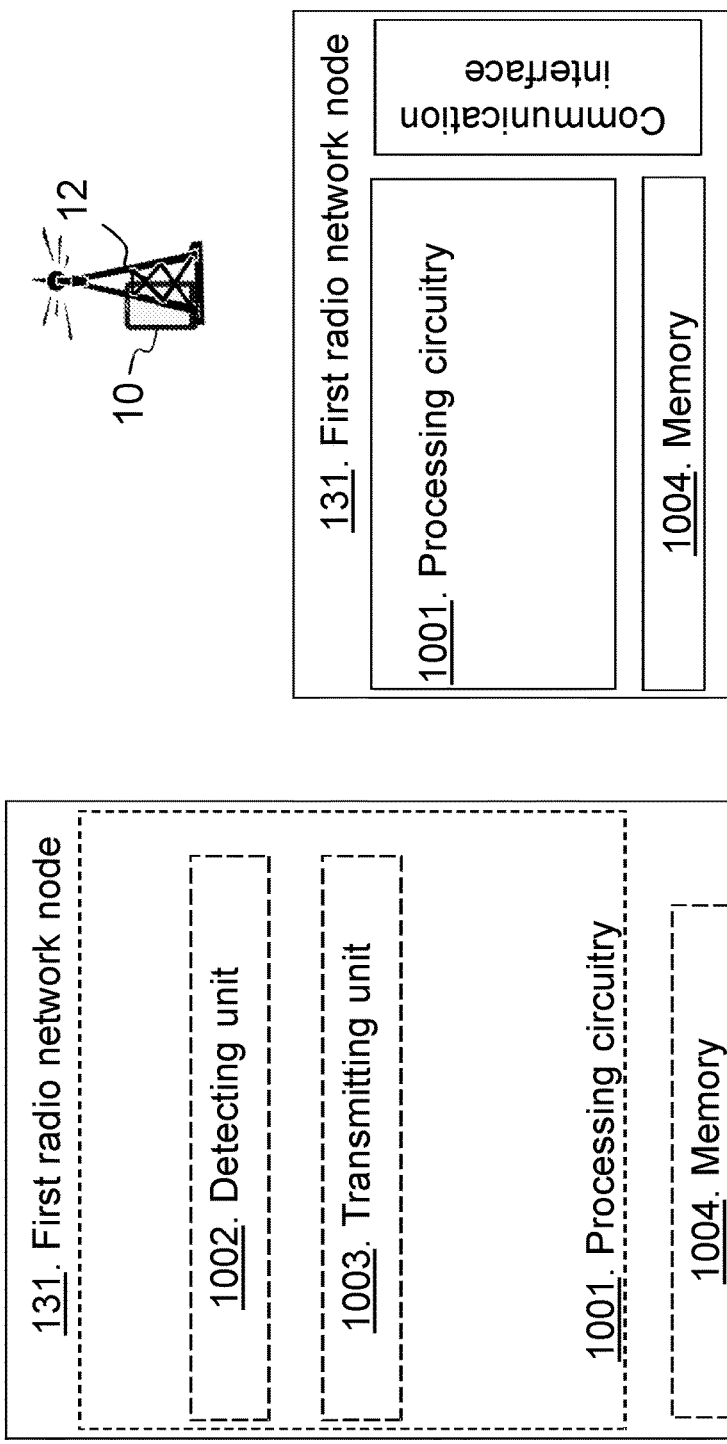
FIG. 10 is a block diagram depicting a first radio network node according to embodiments herein.

FIG. 10 is a block diagram depicting the first radio network node 131, such as a relay node also denoted as an IAB node, for handling data packets or handling communication in a wireless communications network 1 according to embodiments herein. In some embodiments, the first network node 131 is represented by an intermediate IAB node in a multi-hop IAB network.

The first radio network node 131 may comprise processing circuitry 1001, e.g. one or more processors, configured to perform the methods herein.

The first radio network node 131 may comprise a detecting unit 1002. The first radio network node 131, the processing circuitry 1001, and/or the detecting unit 1002 is configured to detect congestion over the link e.g. towards the second radio network node 132 e.g. a data packet experiences a delay above a threshold.

The detected congestion may comprise any one out of: That a delay is experienced of a packet that has exceeded a threshold, and resource blocks availability is becoming scarce.

The first radio network node 131 may comprise a transmitting unit 1003. The first radio network node 131, the processing circuitry 1001, and/or the transmitting unit 1003 is configured to transmit a data packet towards the second radio network node 132, wherein the data packet has been added with a marking indicating that congestion is detected in the first radio network node 131.

The marking may further comprise an indication that indicates any one out of: Which node that has experienced a delay, or, in case of several congested nodes, an end-to-end path on which nodes that has experienced a delay, in case of several congested nodes, the first radio network node that experiences a delay on the path or in case of several congested nodes, the full list of nodes experiencing a delay on the end-to-end path.

The first radio network node 131 further comprises a memory 1004. The memory 1004 comprises one or more units to be used to store data on, such as data packets, events and applications to perform the methods disclosed herein when being executed, and similar. Furthermore, the first radio network node 131 may comprise a communication interface such as comprising a transmitter, a receiver and/or a transceiver.

The methods according to the embodiments described herein for the first radio network node 131 are respectively implemented by means of e.g. a computer program product 1005 or a computer program, comprising instructions, i.e., software code portions, which, when executed on at least one processor, cause the at least one processor to carry out the actions described herein, as performed by the first radio network node 131. The computer program product 1005 may be stored on a computer-readable storage medium 1006, e.g. a disc, a universal serial bus (USB) stick or similar. The computer-readable storage medium 1006, having stored there on the computer program product, may comprise the instructions which, when executed on at least one processor, cause the at least one processor to carry out the actions described herein, as performed by the first radio network node 131. In some embodiments, the computer-readable storage medium may be a transitory or a non-transitory computer-readable storage medium. Thus, embodiments herein may disclose a first radio network node for handling communication in a wireless communications network, wherein the first radio network node comprises processing circuitry and a memory, said memory comprising instructions executable by said processing circuitry whereby said transmitting device is operative to to perform any of the methods herein.

Figure 11:
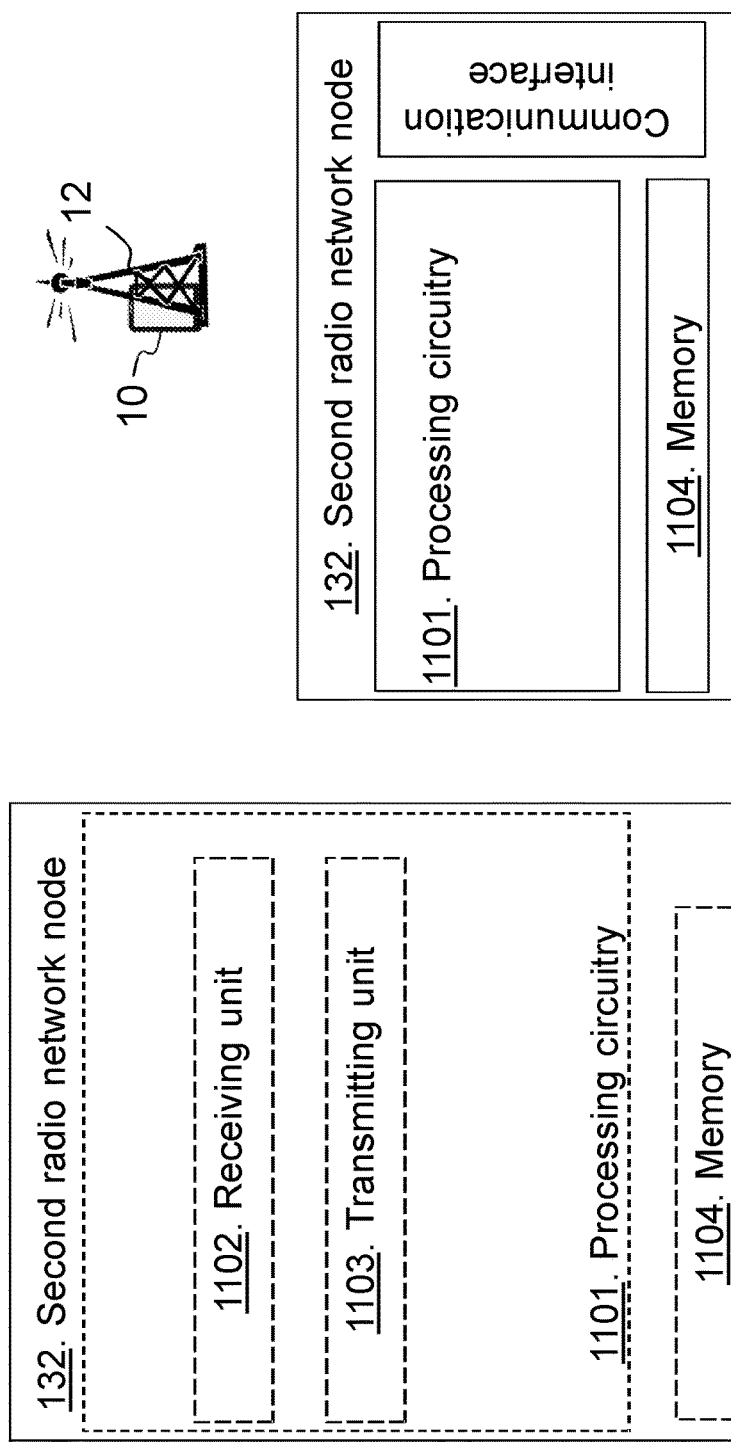
FIG. 11 is a block diagram depicting a second radio network node according to embodiments herein.

FIG. 11 is a block diagram depicting the second radio network node 132, such as a relay node also denoted as an IAB node, for handling data packets or handling communication in a wireless communications network 1 according to embodiments herein. In some embodiments the second network node 132 is represented by a final IAB node in a multi-hop IAB network.

The second radio network node 132 may comprise processing circuitry 1101, e.g. one or more processors, configured to perform the methods herein.

The second radio network node 132 may comprise a receiving unit 1102. The 20 second radio network node 132, the processing circuitry 1101, and/or the receiving unit 1102 is configured to receive a data packet carrying a marking, from the first radio network node 131, wherein the marking indicating that congestion is detected in the first radio network node 131.

The detected congestion in the first radio network node 131 may comprise any one out of:—That a delay is experienced in the first radio network node 131 of a packet that has exceeded a threshold, and—resource blocks availability in the first radio network node 131 is becoming scarce.

The marking may further comprise an indication that indicates any one out of: Which node that has experienced a delay, or, in case of several congested nodes, an end-to-end path on which nodes that has experienced a delay, in case of several congested nodes, the first radio network node that experiences a delay on the path or in case of several congested nodes, the full list of nodes experiencing a delay on the end-to-end path.

The second radio network node 132 may comprise a transmitting unit 1103. The 35 second network node 132, the processing circuitry 1101, and/or the transmitting unit 1103 is configured to transmit a report, to the central network node 12, wherein the report comprises information that congestion has been detected in the first radio network node 131.

The information in the report that congestion has been detected in the first radio network node 131 may comprise any one or more out of:—A flow control report including information about that one or more packet has exceeded a threshold; —a flow control report indicating a volume of received packets with an indication of delay threshold exceeded, and—information about which radio network node has marked the packets.

The second radio network node 132 further comprises a memory 1104. The memory 1104 comprises one or more units to be used to store data on, such as data packets, events and applications to perform the methods disclosed herein when being executed, and similar. Furthermore, the second radio network node 132 may comprise a communication interface such as comprising a transmitter, a receiver and/or a transceiver.

The methods according to the embodiments described herein for the second radio network node 132 are respectively implemented by means of e.g. a computer program product 1105 or a computer program, comprising instructions, i.e., software code portions, which, when executed on at least one processor, cause the at least one processor to carry out the actions described herein, as performed by the second radio network node 132. The computer program product 1105 may be stored on a computer-readable storage medium 1106, e.g. a disc, a universal serial bus (USB) stick or similar. The computer-readable storage medium 1106, having stored there on the computer program product, may comprise the instructions which, when executed on at least one processor, cause the at least one processor to carry out the actions described herein, as performed by the second radio network node 132. In some embodiments, the computer-readable storage medium may be a transitory or a non-transitory computer-readable storage medium. Thus, embodiments herein may disclose a second radio network node for handling communication in a wireless communications network, wherein the second radio network node comprises processing circuitry and a memory, said memory comprising instructions executable by said processing circuitry whereby said transmitting device is operative to to perform any of the methods herein.

Figure 12:
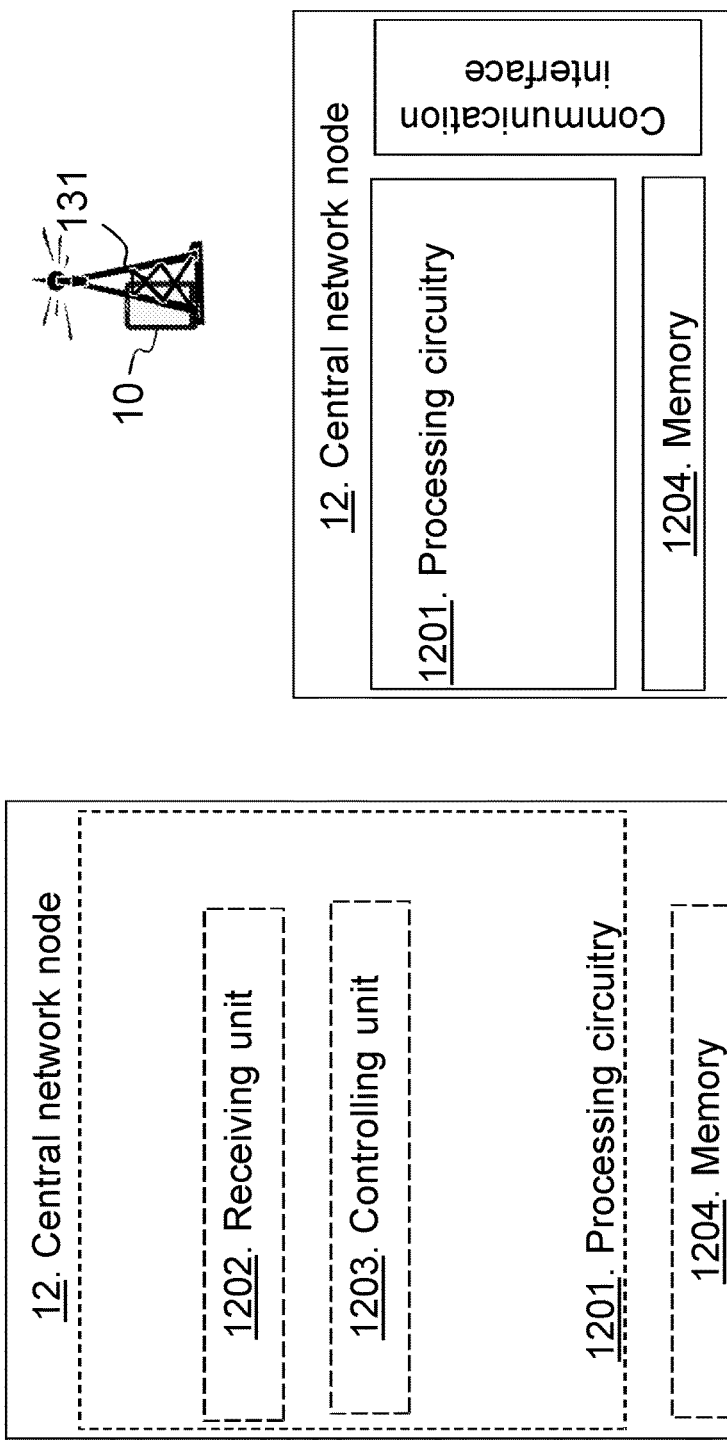
FIG. 12 is a block diagram depicting a central radio network node according to embodiments herein.

FIG. 12 is a block diagram depicting the central radio network node 12, such as an IAB donor, for handling data packets or handling communication in a wireless communications network 1 according to embodiments herein. In some embodiments the central network node 12 is represented by an IAB donor node.

The central network node 12 may comprise processing circuitry 1201, e.g. one or more processors, configured to perform the methods herein.

The central radio network node 12 may comprise a receiving unit 1202. The central radio network node 12, the processing circuitry 1201, and/or the receiving unit 1202 is configured to receive a report, from the second radio network node 132, wherein the report comprises information that congestion has been detected in the first radio network node 131.

The information in the report that congestion has been detected in the first radio network node 131 may comprise any one or more out of:—A flow control report including information about that one or more packet has exceeded a threshold; —a flow control report indicating a volume of received packets with an indication of delay threshold exceeded, and—information about which radio network node has marked the packets.

The central radio network node 12 may comprise a controlling unit 1203. The central radio network node 12, the processing circuitry 1201, and/or the controlling unit 1203 is configured to control data packet transmission based on the report.

The controlling of the data packet transmission based on the report may e.g. comprise adjusting packet transmission rate based on the indication of congestion.

The controlling of the data packet transmission based on the report comprises any one or more out of:—Implementing buffering and queue management functionality on end to end traffic to overcome the congestion indicated, and— rerouting one or more marked end-to-end connections by changing intermediate network nodes of these end-to-end connections.

The first central network node 12 further comprises a memory 1204. The memory 1204 comprises one or more units to be used to store data on, such as data packets, events and applications to perform the methods disclosed herein when being executed, and similar. Furthermore, the central radio network node 12 may comprise a communication interface such as comprising a transmitter, a receiver and/or a transceiver.

The methods according to the embodiments described herein for the central radio network node 12 are respectively implemented by means of e.g. a computer program product 1205 or a computer program, comprising instructions, i.e., software code portions, which, when executed on at least one processor, cause the at least one processor to carry out the actions described herein, as performed by the central radio network node 12. The computer program product 1205 may be stored on a computer-readable storage medium 1206, e.g. a disc, a universal serial bus (USB) stick or similar. The computer-readable storage medium 1206, having stored thereon the computer program product, may comprise the instructions which, when executed on at least one processor, cause the at least one processor to carry out the actions described herein, as performed by the central radio network node 12. In some embodiments, the computer-readable storage medium may be a transitory or a non-transitory computer-readable storage medium. Thus, embodiments herein may disclose a central radio network node for handling communication in a wireless communications network, wherein the central radio network node comprises processing circuitry and a memory, said memory comprising instructions executable by said processing circuitry whereby said transmitting device is operative to to perform any of the methods herein.

In an example:

In some embodiments, the first radio network node 131 such as an intermediate IAB node in a multi-hop IAB network which has received a configuration of a threshold for packet marking, e.g. from CU or from Operations, Administration and Management (OAM) system, wherein any one or more out of:

The first radio network node 131, such as the IAB node, marks a packet with a marking in an adaptation layer header of the packet sent to a subsequent IAB node such as the second radio network node 132.

The marking indicates that a delay experienced in the first radio network node 131, such as the IAB node of the packet has exceeded a threshold.

Additionally or alternatively, the marking may indicate that resource availability (resource blocks) is becoming scarce.

Additionally or alternatively, the marking may further include an indication that indicates which node has experienced the delay such as the congestion, or, in case of several congested nodes on an end-to-end path, the indication of the first radio network node that experiences the delay on the path or the full list of nodes experiencing the delay on the end-to-end path.

In some embodiments, the second radio network node 132 such as a final IAB node in a multi-hop IAB network, which receives a DL packet marked with the marking such as an indication that a delay threshold has been exceeded on the path to the IAB node, wherein any one or more out of:

Sending a flow control report e.g. to a central unit (CU), e.g IAB donor, including information about that one or more packet has exceeded the threshold;

Flow control report may indicate the volume of received packets (bytes) with said indication of delay threshold exceeded.

Additionally or alternatively, the report may also include information about which radio network node has marked the packets.

Additionally or alternatively, the report may also include all or some of the information listed in reference to the first radio network node.

In some embodiments, the central network node 12 such as an IAB-donor CU node that adjusts packet transmission rate based on the indication of congestion in above said flow control report, wherein any one or more out of:

The central network node 12 such as the IAB-donor node may implement buffering and queue management functionality on end to end traffic to overcome the congestion indicated.

Additionally or alternatively, the report based on the congestion indication received, the central network node 12 such as the IAB-donor CU node may reroute one or more marked end-to-end connections by changing the intermediate IAB nodes of these end-to-end connections.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Some example embodiments numbered 1-8 are described below.

Embodiment 1. A method performed by a first radio network node (131), for handling communication in a wireless communications network (1), wherein the wireless communications network (1) comprises the first radio network node (131) and a second radio network node (132) relaying data packets between a central network node (12) and a UE, wherein the first radio network node (131) is an intermediate network node between the second radio network node (132) and the central network node (12), the method comprising:

detecting (701) a congestion over a link towards the second radio network node (132), and transmitting (702) a data packet towards the second radio network node (132), wherein the data packet has been added with a marking indicating that a congestion is detected in the first radio network node (131).

Embodiment 2. A method performed by a second radio network node (132), for handling communication in a wireless communications network (1), wherein the wireless communications network (1) comprises a first radio network node (131) and the second radio network node (132) relaying data packets between a central network node (12) and a UE, wherein the second radio network node (132) is connected directly to one or more user equipment wirelessly, and wherein the first radio network node (131) is an intermediate network node between the second radio network node (132) and the central network node (12), the method comprising:

receiving (801) a data packet carrying a marking, from the first radio network node (131), wherein the marking indicating that a congestion is detected in the first radio network node (131) and transmitting (802) a report, to the central network node (12), wherein the report comprises information that a congestion has been detected in the first radio network node (131).

Embodiment 3. A method performed by a central radio network node (12), for handling communication in a wireless communications network (1), wherein the wireless communications network (1) comprises a first radio network node (131) and a second radio network node (132) relaying data packets between the central network node (12) and a UE, wherein the first radio network node (131) is an intermediate network node between the second radio network node (132) and the central network node (12), the method comprising:

receiving (901) a report, from the second radio network node (132), wherein the report comprises information that a congestion has been detected in the first radio network node (131)

controlling (902) data packet transmission based on the report.

Embodiment 4. A first radio network node (131) for handling communication in a wireless communications network (1), wherein the wireless communications network (1) comprises the first radio network node (131) and a second radio network node (132) relaying data packets between a central network node (12) and a UE, wherein the first radio network node (131) is an intermediate network node between the second radio network node (132) and the central network node (12), and wherein the first radio network node (131) is configured to:

detect a congestion over a link towards the second radio network node (132), and transmit a data packet towards the second radio network node (132), wherein the data packet has been added with a marking indicating that a congestion is detected in the first radio network node (131).

Embodiment 5. A second radio network node (132) for handling communication in a wireless communications network (1), wherein the wireless communications network (1) comprises a first radio network node (131) and the second radio network node (132) relaying data packets between a central network node (12) and a user equipment, and wherein the second radio network node (132) is connected directly to one or more user equipment wirelessly, and wherein the first radio network node (131) is an intermediate network node between the second radio network node (132) and the central network node (12), and wherein the second radio network node (132) is configured to:

receive a data packet carrying a marking, from a first radio network node (131), and transmit a report, to the central network node (12), wherein the report comprises information that a congestion has been detected in the first radio network node (131).

Embodiment 6. A central radio network node (12) for handling communication in a wireless communications network (1), wherein the wireless communications network (1) comprises a first radio network node (131) and a second radio network node (132) relaying data packets between the central network node (12) and a UE, wherein the first radio network node (131) is an intermediate network node between the second radio network node (132) and the central network node (12), wherein the first central network node (12) is configured to:

receive a report, from the second radio network node (132), wherein the report comprises information that a congestion has been detected in the first radio network node (131), and control data packet transmission based on the report.

Embodiment 7. A computer program comprising instructions, which when executed by a processor, causes the processor to perform actions according to any of the embodiments 1-6.

Embodiment 8. A carrier comprising the computer program of embodiment 7, wherein the carrier is one of an electronic signal, an optical signal, an electromagnetic signal, a magnetic signal, an electric signal, a radio signal, a microwave signal, or a computer-readable storage medium.

Figure 13:
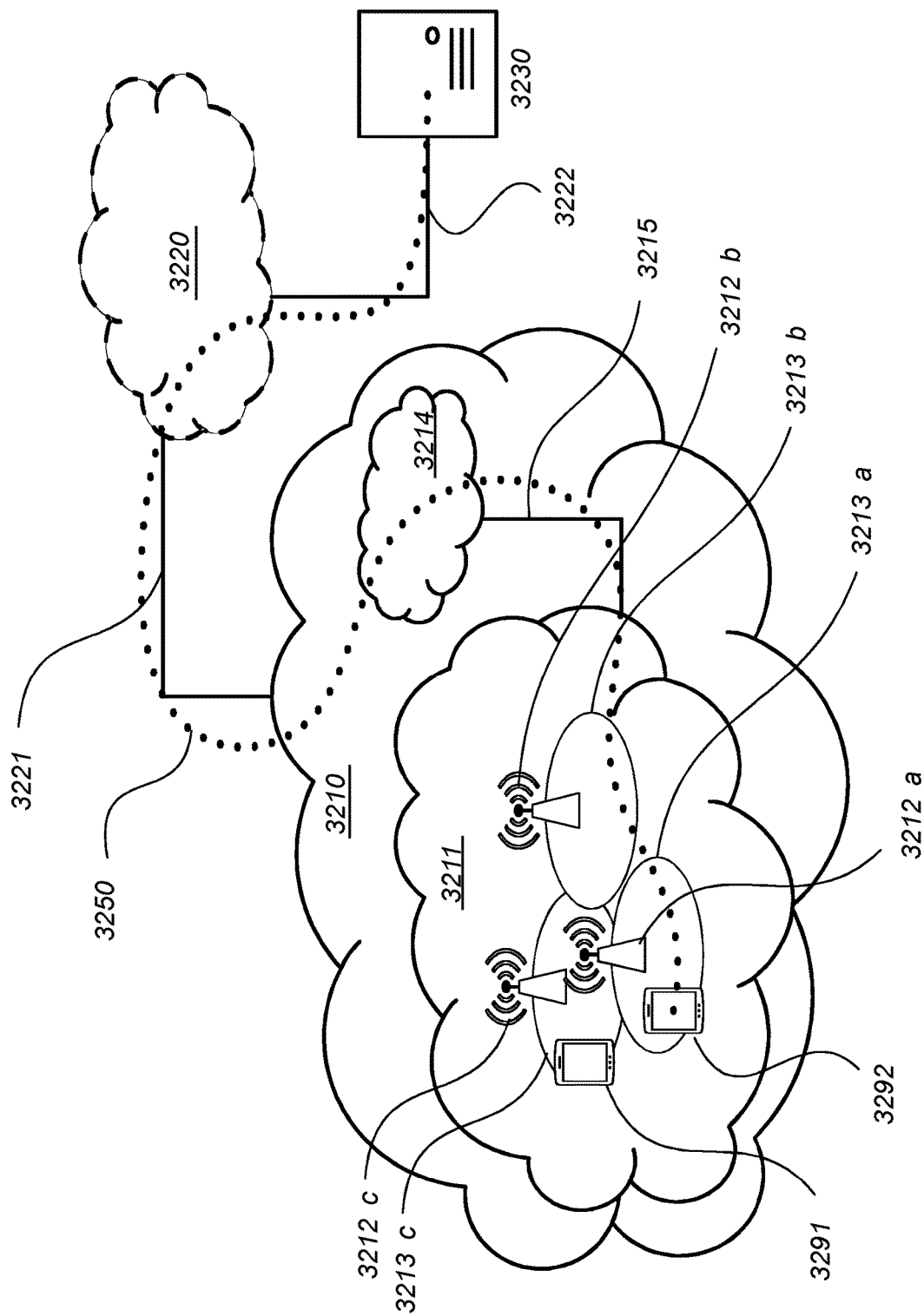
FIG. 13 is a telecommunication network connected via an intermediate network to a host computer in accordance with some embodiments.

FIG. 13 shows a Telecommunication network connected via an intermediate network to a host computer in accordance with some embodiments. With reference to FIG. 13, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points being examples of the radio network node 12 above, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 13 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 14:
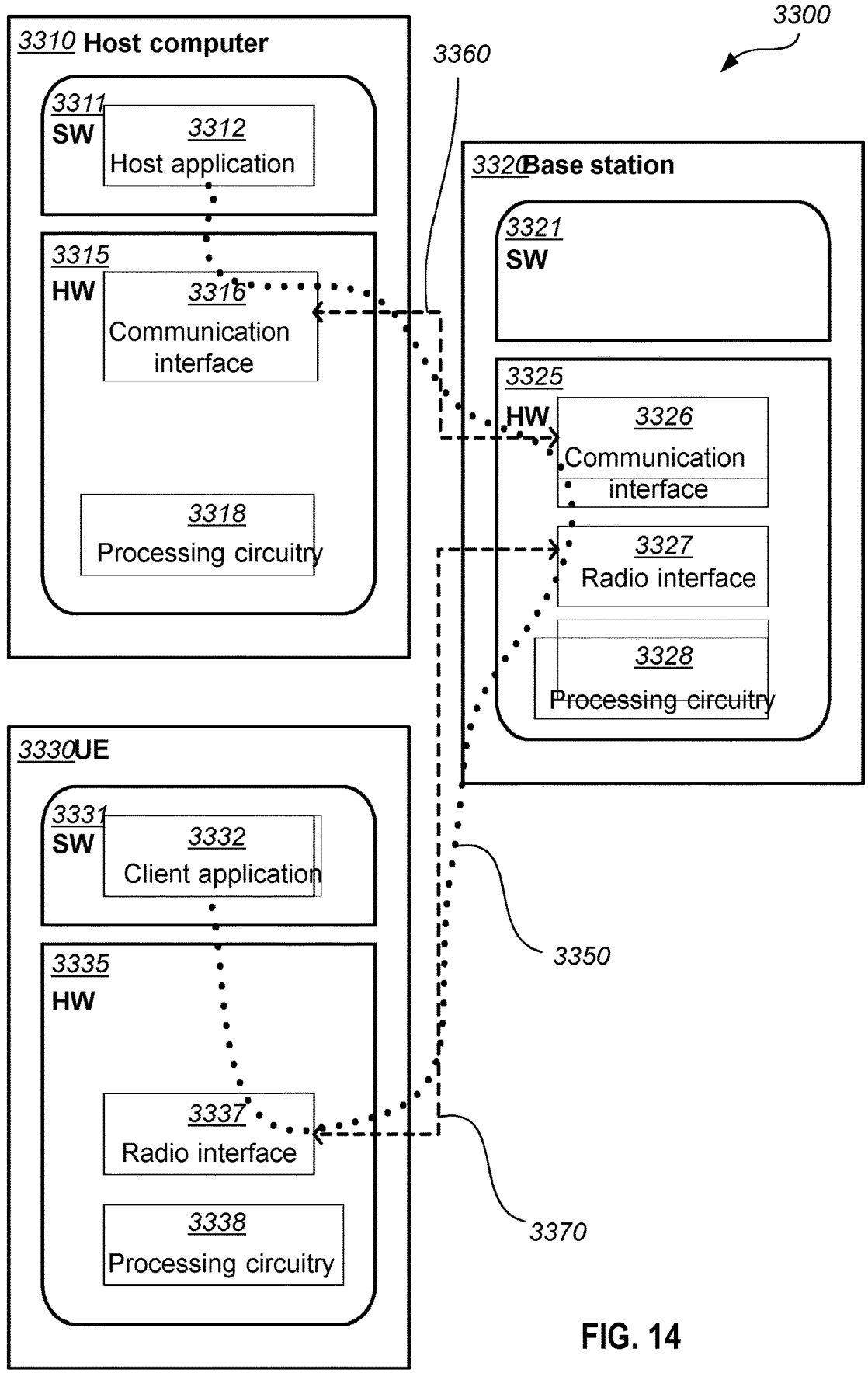
FIG. 14 is a host computer communicating via a base station with a user equipment over a partially wireless connection in accordance with some embodiments.

FIG. 14 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 16. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 14) served by base station 3320. Communication interface 3326 may be configured to facilitate connection 3360 to host computer 3310. Connection 3360 may be direct or it may pass through a core network (not shown in FIG. 16) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 14 may be similar or identical to host computer 3230, one of base stations 3212a, 3212b, 3212c and one of UEs 3291, 3292 of FIG. 13, respectively. This is to say, the inner workings of these entities may be as shown in FIG. 14 and independently, the surrounding network topology may be that of FIG. 13.

In FIG. 14, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments make it possible to decrease the excess delay over the network, even in times when the network is loaded. If congestion occurs the intermediate nodes may start performing packet marking, making it possible to reduce the flow rate. Thereby the data communication, e.g. the handling or managing of data packets may be performed in an efficient manner.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 15, 16:
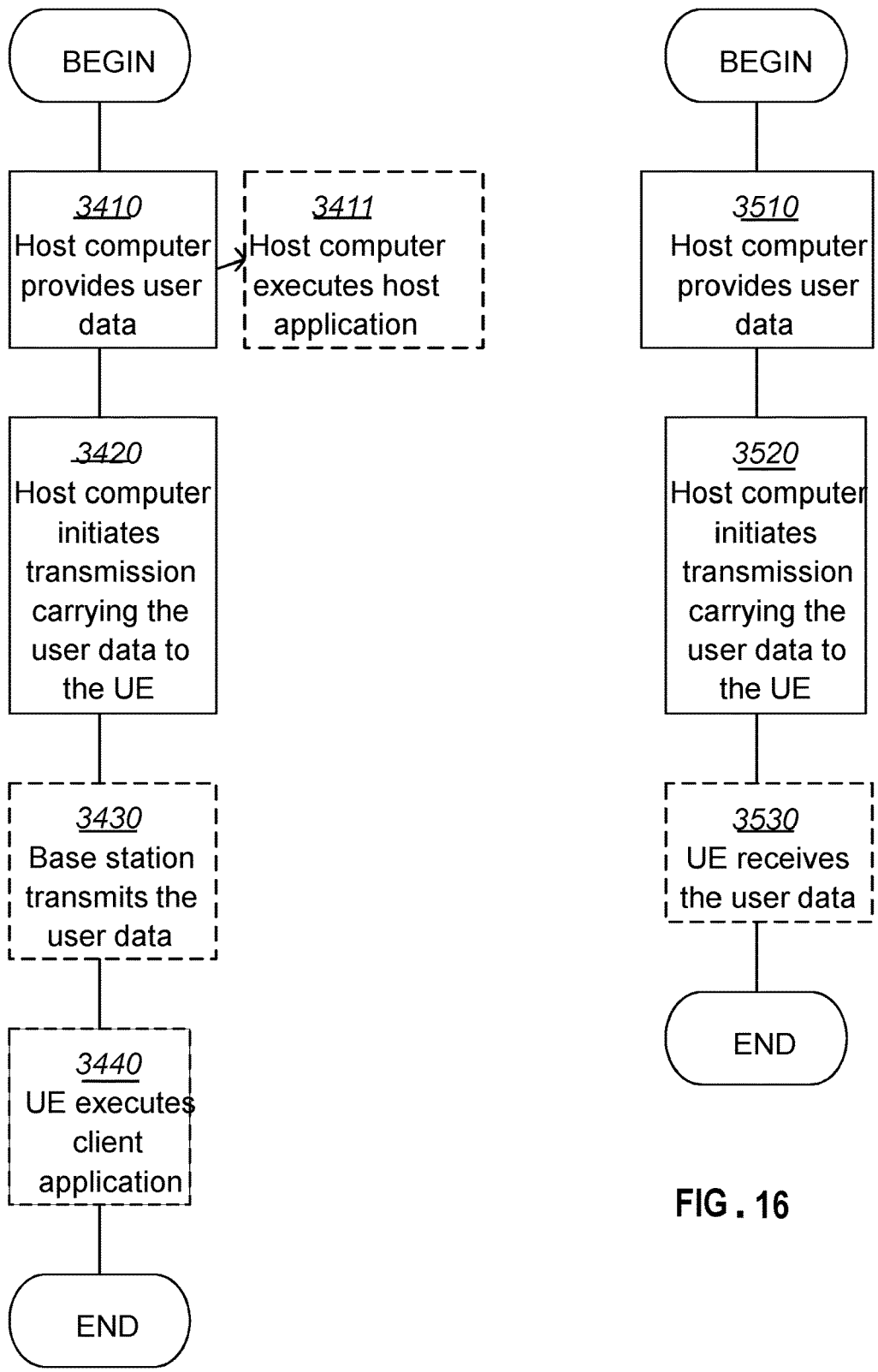
FIG. 15 is methods implemented in a communication system including a host computer, a base station and a user equipment in accordance with some embodiments.
FIG. 16 is methods implemented in a communication system including a host computer, a base station and a user equipment in accordance with some embodiments.

FIG. 15 shows methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIG. 13 and FIG. 14. For simplicity of the present disclosure, only drawing references to FIG. 15 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 16 shows methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIG. 13 and FIG. 14. For simplicity of the present disclosure, only drawing references to FIG. 16 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 17:
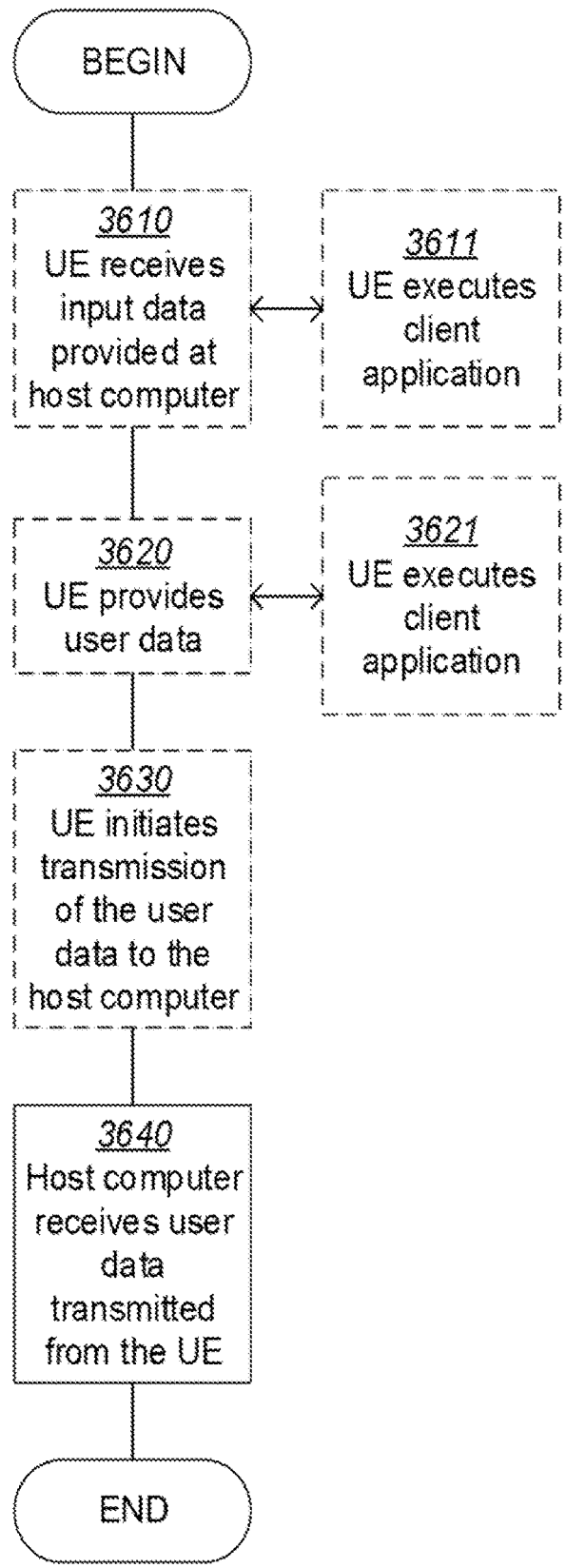
FIG. 17 is methods implemented in a communication system including a host computer, a base station and a user equipment in accordance with some embodiments.
Figure 18:
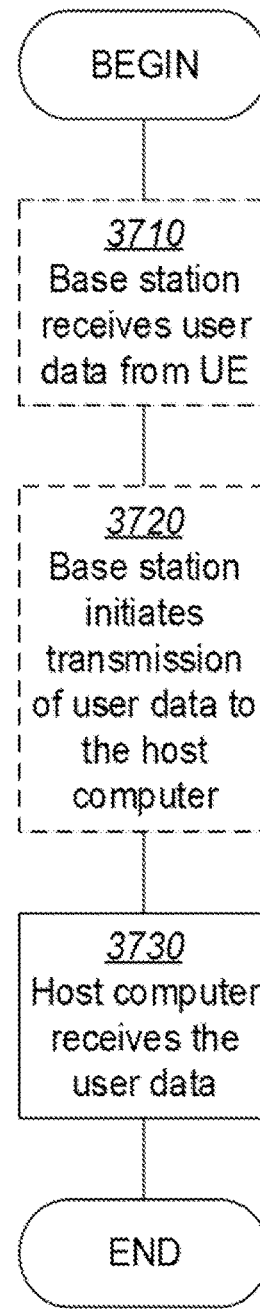
FIG. 18 is methods implemented in a communication system including a host computer, a base station and a user equipment in accordance with some embodiments.

FIG. 17 shows methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIG. 13 and FIG. 14. For simplicity of the present disclosure, only drawing references to FIG. 17 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 19 show methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIG. 13 and FIG. 14. For simplicity of the present disclosure, only drawing references to FIG. 19 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATION EXPLANATION

AMF Access and Mobility Management Function
CU Central Unit
DCTCP Data Center TCP
DL Downlink
DU Distributed Unit
OAM Operations, Administration and Management
RTT Round Trip Time
SMF Session Management Function
UPF User Plane Function

REFERENCES 1. https://people.csail.mit.edu/alizadeh/papers/dctcp-sigcomm10.pdf

The invention claimed is:

1. A method performed by a final Integrated Access and wireless access Backhaul (IAB) node of a wireless communications network with respect to a traffic flow for a user equipment (UE) connected wirelessly to the final IAB node, wherein the traffic flow traverses a multi-hop path including one or more intermediate IAB nodes coupling the final IAB node to a donor IAB node, and wherein the method comprises:
    receiving data packets of the traffic flow from a last one of the one or more intermediate IAB nodes along the multi-hop path, the data packets carrying marking applied by each intermediate IAB node that is experiencing congestion with respect to transmitting the data packets along the multi-hop path; and
    transmitting a report to the donor IAB node based on the marking, wherein the report indicates that at least one of the one or more intermediate IAB nodes is experiencing congestion with respect to transmitting the data packets along the multi-hop path.

2. The method according to claim 1, wherein congestion at any given intermediate IAB node comprises the data packets of the traffic flow experiencing queuing delays for next-hop transmission that exceed a threshold.

3. The method according to claim 1, wherein the report identifies at least one of: a first one among the one or more intermediate nodes that is experiencing congestion, or a list of all intermediate IAB nodes that are experiencing congestion.

4. The method according to claim 1, wherein the report indicates a volume of data packets in the traffic flow that are affected by the congestion.

5. The method according to claim 1, wherein the UE is one among two or more UEs served by the final IAB node, and wherein the method comprises the final IAB node performing congestion reporting for all traffic flows terminating at UEs served by the final IAB, and wherein one or more other traffic flows traverse the final IAB for one or more other UEs served by one or more other final IAB nodes for which the final IAB node acts as a corresponding intermediate IAB node, and wherein the method includes the final IAB node applying congestion marking to data packets of the one or more other traffic flows in response to detecting congestion with respect to traversal through the final IAB node of those one or more other traffic flows.

6. A method performed by a donor Integrated Access and wireless access Backhaul (IAB) node of a wireless communications network with respect to a traffic flow for a user equipment (UE) connected wirelessly to a final IAB node, wherein the traffic flow traverses a multi-hop path including one or more intermediate IAB nodes coupling the donor IAB node to the final IAB node, the method comprising:
   receiving a report, from the final IAB node, indicating that at least one of the one or more intermediate IAB nodes is experiencing congestion with respect to transmitting data packets of the traffic flow along the multi-hop path; and
   controlling data packet transmission for the traffic flow, based on the report.

7. The method according to claim 6, wherein the report identifies at least one of: a first one among the one or more intermediate IAB nodes that is experiencing congestion, a list of all intermediate IAB nodes that are experiencing congestion, or a volume of data packets in the traffic flow that are affected by the congestion.

8. The method according to claim 6, wherein controlling data packet transmission for the traffic flow comprises adjusting a packet transmission rate from the donor IAB node towards the UE.

9. The method according to claim 6, wherein controlling data packet transmission for the traffic flow comprises at least one of:
   implementing buffering and queue management functionality for the traffic flow to overcome the congestion; or
   changing which intermediate IAB node or nodes are included in the multi-hop path.

10. A method performed by an Integrated Access and wireless access Backhaul (IAB) node of a wireless communications network operating as one of one or more intermediate IAB nodes with respect to a traffic flow for a user equipment (UE) connected wirelessly to a final IAB node, wherein the traffic flow traverses a multi-hop path that includes the one or more intermediate IAB nodes coupling the final IAB node to a donor IAB node, and wherein the method comprises:
   detecting that the IAB node is experiencing congestion with respect to transmitting data packets of the traffic flow along the multi-hop path; and
   responsive to detecting the congestion, marking one or more affected data packets of the traffic flow, so that the final IAB node is aware of the congestion.

11. The method according to claim 10, wherein detecting that the IAB node is experiencing congestion with respect to transmitting data packets of the traffic flow along the multi-hop path comprises determining that one or more data packets of the traffic flow experience egress delays from the IAB node in excess of a threshold.

12. The method according to claim 10, wherein the marking applied by the IAB node is additive with respect to marking applied by one or more IAB nodes operating as one or more preceding intermediate IAB nodes in the multi-hop path and experiencing congestion with respect to transmitting data packets of the traffic flow along the multi-hop path, such that data packets of the traffic flow arrive at the final IAB node with markings indicating all intermediate IAB nodes of the multi-hop path that are experiencing congestion with respect to transmitting data packets of the traffic flow along the multi-hop path.

13. A method of flow control with respect to a traffic flow going over a multi-hop path comprising a donor Integrated Access and wireless access Backhaul (IAB) node, a final IAB node having a wireless connection to a User Equipment (UE) associated with the traffic flow, and one or more intermediate IAB nodes between the final and donor IAB nodes, the method comprising:
   at each intermediate IAB node, monitoring for congestion affecting transmission of data packets of the traffic flow to a next hop of the multi-hop path and, responsive to detecting such congestion, applying node-specific congestion marking to one or more affected data packets of the traffic flow;
   at the final IAB node, transmitting a flow control report towards the donor IAB node, the flow control report indicating whether or which ones of the one or more intermediate IAB nodes are experiencing congestion; and
   at the donor IAB node, performing flow control for the traffic flow, based on the flow control report.

14. A method of operation in a wireless communications network, the method comprising:
   at a first Integrated Access and wireless access Backhaul (IAB) node:
      for first traffic flows that target first User Equipments (UEs) served by the first IAB node, transmitting the first traffic flows to the first UEs and, in a case where there are one or more upstream IAB nodes forwarding the first traffic flows from a donor IAB node, transmitting congestion reports for the first traffic flows towards the donor IAB node, based on per-node congestion marking applied by the one or more upstream IAB nodes in response to each such upstream IAB node detecting excess delays associated with next-hop forwarding of the first traffic flows; and
      for second traffic flows for which the first IAB node acts as an upstream IAB node forwarding the second traffic flows towards one or more downstream IAB nodes that serve second UEs targeted by the second traffic flows, preserving any congestion marking contained in data packets of the second traffic flows, while adding own-node congestion marking to the same or other data packets of the second traffic flows, responsive to detecting excess delays associated with next-hop forwarding of the second traffic flows by the first IAB node; and at the donor IAB node:
    performing traffic flow control for the first traffic flows and the second traffic flows, responsive to the congestion reports received from respective ones of the serving IAB nodes.

* * * * *